United States Patent
Rompe

(10) Patent No.: US 10,766,375 B2
(45) Date of Patent: Sep. 8, 2020

(54) POSITION-DETERMINING SYSTEM

(71) Applicant: SIEMENS MOBILITY GMBH, Munich (DE)

(72) Inventor: Andre Rompe, Berlin Kaulsdorf (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 16/092,268

(22) PCT Filed: Mar. 10, 2017

(86) PCT No.: PCT/EP2017/055657
§ 371 (c)(1),
(2) Date: Oct. 9, 2018

(87) PCT Pub. No.: WO2017/174292
PCT Pub. Date: Oct. 12, 2017

(65) Prior Publication Data
US 2019/0143842 A1 May 16, 2019

(30) Foreign Application Priority Data

Apr. 7, 2016 (DE) .......... 10 2016 205 804

(51) Int. Cl.
B60L 53/37 (2019.01)
B60L 53/14 (2019.01)
(Continued)

(52) U.S. Cl.
CPC .............. B60L 53/37 (2019.02); B60L 53/14 (2019.02); B60L 53/32 (2019.02); B60L 53/36 (2019.02);
(Continued)

(58) Field of Classification Search
CPC .......... B60L 53/37; B60L 53/36; B60L 53/32; B60L 53/14; B60L 53/65; B60L 53/66;
(Continued)

(56) References Cited

U.S. PATENT DOCUMENTS

| 7,671,338 B2 * | 3/2010 | Key | .................. G01J 5/0088 250/339.03 |
| 9,056,676 B1 | 6/2015 | Wang | |

(Continued)

FOREIGN PATENT DOCUMENTS

| AT | 516078 A1 | 2/2016 |
| DE | 102011109834 A1 | 2/2013 |

(Continued)

Primary Examiner — Stacy Whitmore
(74) Attorney, Agent, or Firm — Laurence Greenberg; Werner Stemer; Ralph Locher

(57) ABSTRACT

A position-determining system is provided for a charging station for a vehicle being driven at least partially electrically. The position-determining system serves to determine a position of a contact interface of the vehicle in relation to a charging interface of the charging station. The position-determining system determines the position visually in at least two dimensions. As a result of the at least two-dimensional determination of the position, the vehicle is not tied to a predefined route. This increases the reliability of the positioning of the vehicle when it approaches the charging station.

12 Claims, 2 Drawing Sheets

(51) Int. Cl.
  *B60L 53/30* (2019.01)
  *B60L 53/36* (2019.01)
  *B60L 53/66* (2019.01)
  *B60L 53/65* (2019.01)
  *B60L 53/35* (2019.01)
  *G06T 7/62* (2017.01)
  *G06T 7/73* (2017.01)
  *G06T 7/70* (2017.01)

(52) U.S. Cl.
  CPC ............... *B60L 53/65* (2019.02); *B60L 53/66* (2019.02); *G06T 7/62* (2017.01); *G06T 7/74* (2017.01); *B60L 2250/16* (2013.01); *G06T 2207/10048* (2013.01); *G06T 2207/30252* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01)

(58) Field of Classification Search
  CPC ......... B60L 2250/16; G06T 7/74; G06T 7/62; G06T 2207/30252; G06T 2207/10048; Y02T 90/128; Y02T 90/14; Y02T 90/121; Y02T 90/125; Y02T 10/7005; Y02T 10/7072
  See application file for complete search history.

(56) References Cited

U.S. PATENT DOCUMENTS

| | | | |
|---|---|---|---|
| 9,272,631 B2 | 3/2016 | Bendicks | |
| 9,508,146 B2* | 11/2016 | Davies | G06T 3/60 |
| 9,736,438 B2* | 8/2017 | Asano | G01S 17/89 |
| 10,223,890 B2* | 3/2019 | Kirenko | A61B 5/1115 |
| 2002/0175994 A1* | 11/2002 | Sakakibara | G01B 11/24 348/135 |
| 2008/0317281 A1* | 12/2008 | Goldbach | G16H 40/40 382/103 |
| 2010/0201309 A1* | 8/2010 | Meek | B60L 53/34 320/108 |
| 2010/0235006 A1 | 9/2010 | Brown | |
| 2011/0221387 A1* | 9/2011 | Steigerwald | B60L 11/182 320/108 |
| 2014/0067660 A1 | 3/2014 | Cornish | |
| 2014/0313349 A1 | 10/2014 | Aoki et al. | |
| 2015/0042278 A1 | 2/2015 | Leary | |
| 2015/0231981 A1 | 8/2015 | Kees et al. | |
| 2016/0039541 A1 | 2/2016 | Beardsley et al. | |
| 2016/0090007 A1 | 3/2016 | Buehs et al. | |
| 2016/0116568 A1 | 4/2016 | Heuer et al. | |
| 2016/0144734 A1* | 5/2016 | Wang | B60L 11/1822 701/17 |
| 2016/0272074 A1* | 9/2016 | McGrath | B60L 5/42 |
| 2016/0311335 A1* | 10/2016 | Sarkar | B60L 3/04 |
| 2016/0318415 A1* | 11/2016 | Salasoo | G05D 1/0225 |
| 2016/0380488 A1* | 12/2016 | Widmer | H04B 5/0037 324/207.15 |
| 2017/0169691 A1* | 6/2017 | Kirenko | A61B 5/1117 |
| 2017/0210237 A1 | 7/2017 | Buehs et al. | |
| 2017/0212237 A1 | 7/2017 | Buehs et al. | |
| 2017/0217324 A1 | 8/2017 | Buehs et al. | |
| 2018/0264959 A1* | 9/2018 | Weigel | B60L 53/35 |

FOREIGN PATENT DOCUMENTS

| | | |
|---|---|---|
| DE | 102012205276 A1 | 10/2013 |
| DE | 102014210759 A1 | 12/2015 |
| DE | 102014219466 A1 | 3/2016 |
| GB | 2523186 A | 8/2015 |
| JP | 2014215645 A | 11/2014 |
| WO | 2014183961 A1 | 11/2014 |
| WO | 2016012184 A1 | 1/2016 |

* cited by examiner

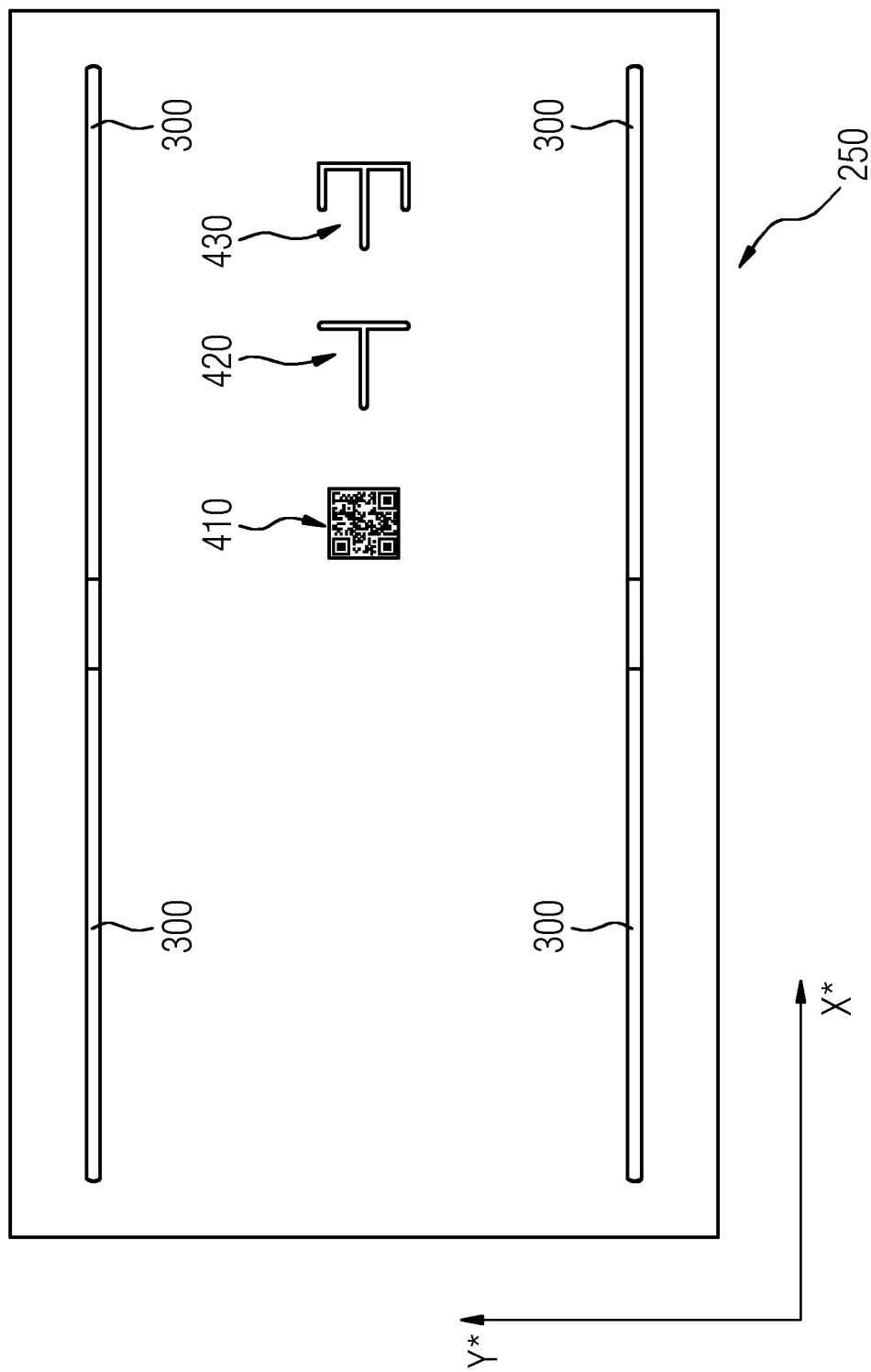

POSITION-DETERMINING SYSTEM

BACKGROUND OF THE INVENTION

Field of the Invention

The invention concerns a position-determining system for a charging station for an at least partly electrically driven vehicle. Furthermore, the invention concerns such a vehicle and a system with such a vehicle and a charging station.

At least partly electrically operated vehicles comprise rechargeable batteries, which are referred to as secondary batteries. An example of such vehicles is electrically operated scheduled service vehicles (eBuses). Electric drives are therefore advantageous for scheduled service vehicles, because the scheduled service travel times are usually limited and separated by periods of time (scheduled breaks), in which the battery can be charged up. Furthermore, scheduled service vehicles travel on fixed routes, so that charging stations can be set up on the route.

For the charging process, a charging interface of the charging station must be brought into contact with a contact interface of the vehicle. One of the two interfaces can comprise a pantograph for said contacting. So that the contacting is actually possible, the contact interface must be positioned in a specified region relative to the charging station.

The contact interface can be disposed on a roof of the vehicle and an inverse pantograph can form the charging interface on the charging station. The pantograph is disposed on a mast of the charging station. Said mechanical arrangement enables certain tolerances for the relative position of the vehicle in the direction of the road and transversely thereto. Examples of tolerances in the direction of the road and transversely thereto are 0.6 m in each case. For charging, the vehicle must be positioned within said region, so that contact elements of the contact interface can come into contact with contact elements of the pantograph and thus the prerequisite for charging the battery is met.

For the correct position in the direction of the road, a vehicle driver can orient relative to road markings. This method has proved prone to errors in practice, however.

WO2014183961 proposes another positioning method. In this case, iterative and ultrasound-based distances between the vehicle and the charging station are measured while the vehicle is travelling on a specified route.

SUMMARY OF THE INVENTION

It is the object of the present invention to increase the accuracy and reliability of the position determination when approaching charging stations.

According to the invention, a position-determining system according to the main system claim is provided.

The position-determining system is prepared for a charging station. The charging station is prepared for an at least partly electrically driven vehicle. The position determination system is used for determining a position of a contact interface of the vehicle relative to a charging interface of the charging station. The position-determining system determines the position optically in at least two dimensions.

Owing to the at least two-dimensional position determination, the vehicle is no longer tied to a specified route. This increases the accuracy and reliability of the position determination. Information about and maintaining a specified route is not necessary.

In a preferred embodiment, the position-determining system is embodied to determine the position using geometric features of the contact interface.

Only the relative position of the contact interface to the charging interface is relevant to positioning. Owing to the geometric features thereof, the contact interface forms an optically detectable, natural position marker.

In addition or alternatively, the position determining system can be embodied to determine the position using at least one position marker, and possibly additional position markers.

In particular, this enables a specially embodied position marker, which can be detected particularly well and/or easily or reliably. In addition or alternatively, information about the respective vehicle, for example vehicle height, vehicle type and/or vehicle ID, can be encoded in the position marker.

The position-determining system can in particular comprise a camera and an analysis unit. The analysis unit can be prepared to determine the position using images of the camera.

Camera-based position determination is particularly flexible. A further advantage of camera-based position determination is the possibility of determining a distance of the contact interface from the charging interface using a size of the position marker in a camera image.

In a further embodiment, an additional distance sensor can be used in order to determine the distance from the pantograph to the contact interface.

The camera can in particular be an infrared camera. As a result, daylight-independent position marker detection is enabled. The camera can additionally comprise an infrared illumination unit.

The charging station according to the main charging station claim that is presented according to the invention comprises a position-determining system according to the invention and furthermore an infrared illumination unit. The infrared illumination unit is used for illuminating a region with infrared light. The region comprises a sub region, in which the contact interface must be disposed so as to be contactable by the charging interface.

In a preferred embodiment, the charging station can be prepared to only enable a charging process if the position determination shows that the contact interface is disposed in the sub region.

A vehicle according to the main vehicle claim that is presented according to the invention can be at least partly electrically driven and comprises a storage device for electrical energy and a contact interface. The contact interface can be contacted by a charging interface of a charging station so that the storage device is charged. The contact interface comprises at least one position marker.

The position marker can be embodied to selectively reflect and/or radiate light in a specified range of wavelengths.

For example, the position marker can comprise one or more light-emitting diodes. Alternatively or additionally, the position marker can comprise geometric figures or codes.

The vehicle can comprise a heating element for heating the position marker. As a result, the detectability of the position marker can remain guaranteed in the event of snow and/or ice.

BRIEF DESCRIPTION OF THE SEVERAL VIEWS OF THE DRAWING

According to the invention, a system with a vehicle and a charging station is also presented.

The vehicle and the charging station can each comprise a unit for data transmission. The charging station can be embodied to transmit the determined position to the vehicle.

Figure 1:
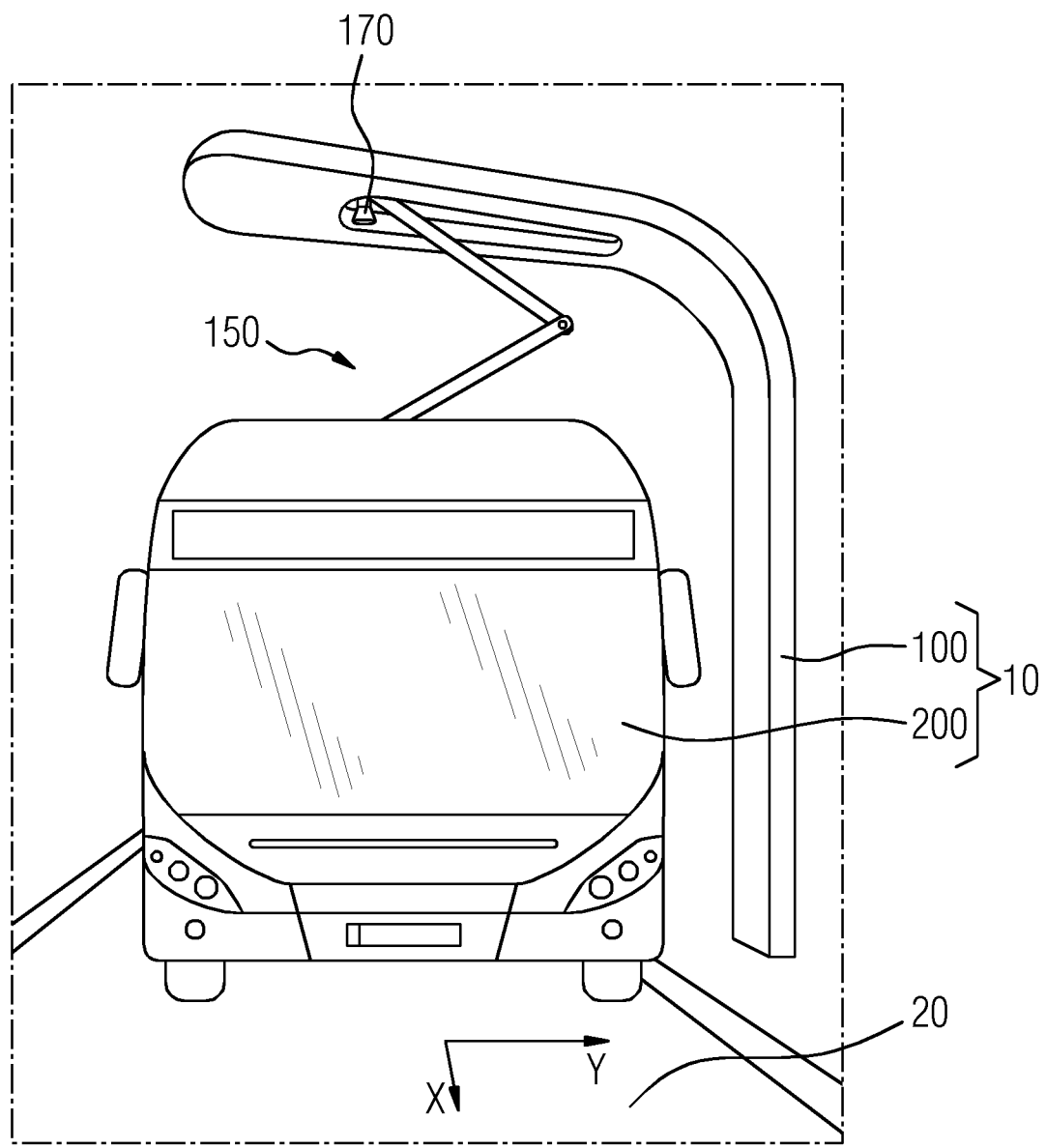

The charging station and/or the vehicle can comprise a telemetry unit for telemetry of the determined position. The vehicle can comprise a display and can be embodied to display the transmitted position of the vehicle on the display.

Furthermore, in the system information about the light-emitting diodes, the geometric figures and/or the codes can be transmitted from the vehicle to the charging station.

In this case, the transmitted information about the light-emitting diodes can be used for positive association of the vehicle with the charging station, for example.

The properties, features and advantages of said invention described above and the manner in which they are achieved will be understood more clearly and positively in connection with the following description of the exemplary embodiments, which are described in detail in connection with the drawings. In the figures:

FIG. 1 shows a system according to the invention in accordance with an exemplary embodiment and FIG. 2 shows by way of example and schematically a contact interface of a vehicle according to the invention.

DESCRIPTION OF THE INVENTION

In FIG. 1, a system according to the invention 10 with a charging station 100 and an at least partly electrically driven vehicle 200 is shown according to an exemplary embodiment. A contact interface 250 on the roof of the vehicle 200, but which is not visible in FIG. 1, is positioned relative to a charging interface 150, which is embodied by way of example as a pantograph, in a region in which the contact interface 250 can be contacted by means of the charging interface 150.

The charging station 100 comprises a mast on the side of a road 20 with an arm extending over the road 20 in the lateral direction Y transverse to the direction of the road X and on which the pantograph is disposed. The charging station 100 comprises a position-determining system, which determines the position in the direction of the road X and in the lateral direction Y optically by means of a camera 170. The camera 170 detects a position tolerance field for contacting by the pantograph.

FIG. 2 shows by way of example and schematically a contact interface 250 of a vehicle 200 according to the invention. The contact interface 250 comprises parallel contact rails 300. Furthermore, the contact interface 250 in the exemplary embodiment comprises position markers 410, 420, 430. In the example, three position markers are schematically represented. The contact interface 250 can however also comprise only one, two or more than three position markers. In the example represented, a code is embodied in the position markers 410 in two-dimensional form, in which information about the vehicle is encoded. The other two illustrated position marker examples 420, 430 are T-shaped with transverse beams oriented in the lateral direction of the vehicle Y* transverse to the direction of the vehicle X*. As a result, in particular an angle difference between the direction of the vehicle X* and the direction of the road X can be determined well in a camera image.

In a further example of an embodiment of the invention, an arrangement and a method are proposed, with which the vehicle position and orientation of electrically operated vehicles, for example of eBuses, relative to a charging interface with a pantograph on the station side can be reliably and accurately determined in the direction of the road and transversely thereto. In the example, the position determination is carried out iteratively and also provides already suitable position information when the bus is approaching the charging station, so that the position information provided by the position sensor can be used as a control variable for the driver.

A camera is used for the optical position determination in one example of an embodiment. The field of view of the camera is directed towards the position tolerance field. Because the contact interface is disposed on the roof of the bus, the camera is directed towards the contact interface perpendicularly or at a predetermined angle from above.

The camera is connected to an analyzer that calculates signals for the orientation and position of the position marker from the camera images. The analyzer can be a microprocessor or a PC.

The camera can for example be an infrared camera that detects the surroundings of a position tolerance region within which the contact interface must lie so that it can be contacted by means of the charging interface.

Said surroundings can be illuminated by a special IR illumination. As a result, independence from daylight can be achieved and robustness against light artifacts can be increased.

The calculation of the position of the contact interface on the bus can be carried out based on features that result from the geometry of the contact interface.

The position determination is even more robust and independent if there is or are one or more position markers in the region of the contact interface. The position markers can then be specially optically and/or geometrically embodied so that reliable optical position determination is possible under all daylight and weather conditions.

In one exemplary embodiment, the position marker or the position markers is/are therefore embodied as infrared reflector(s). In addition or alternatively, the position marker can comprise one or more infrared light-emitting diodes.

An analyzer determines the position of the contact interface of the bus relative to the charging station horizontally in two dimensions from the image position of the detected position marker(s) in the camera image. Optionally, the position of the contact interface of the bus relative to the charging station can also be determined vertically using an image size of the detected position marker(s) in the camera image.

The determined relative position is fed to a charging control unit. The charging control unit uses the position information to indicate to the driver the position of the contact interface of the bus relative to the charging station. For example, this can be carried out by direction indicators such as directional arrows, a light or a display on the charging station.

The light is particularly advantageous if the charging station is prepared to enable the charging process only if the bus is parked within the position tolerance field specified by the charging interface, so that the contact interface is in the region in which the contact interface must lie so that it can be contacted by means of the charging interface. The latter functionality can also be implemented without direction indicators.

In addition or alternatively for example, the position information can be transmitted and thus telemetered to the bus by means of a wireless network, for example a WLAN. Position information can be displayed to the bus driver online in real time on the driver's display of the bus.

Some buses can be lowered on an entry side in order to facilitate entry by passengers. This is referred to as kneeling.

Using the position information, additionally or alternatively information about whether kneeling at the specified vehicle position is possible or not can be transmitted to a kneeling-capable bus. Corresponding enabling of said function can depend on said information.

The reflectors can furthermore be optionally heated. Then ice and/or snow deposits can be thawed. In particular, the heating of the reflectors can be carried out on falling below a temperature limit and/or on detecting snowfall, so that no ice can form and/or snow already melts on contact.

The position marker can comprise a simple geometric figure. The figure can have a predetermined size, so that a distance between the position marker and the camera can be concluded from imaging properties of the camera. Then a vertical position of the position marker can also be determined.

In addition or alternatively to the geometric figure, there can be a two-dimensional code, for example a QR code, on the vehicle, in which information about the vehicle type, about a vehicle identification number (vehicle ID) and/or a height of the vehicle is encoded.

The position marker(s) can comprise suitably disposed elements that are selectively reflective and/or emissive in a range of wavelengths, for example colored light-emitting diodes or infrared light-emitting diodes. The position marker is thus more reliably detectable.

The position marker can additionally be used for information transmission, for example in order to transmit the vehicle ID if the actively emitting elements are emitting with suitable modulation.

In the case of wireless transmission of information between the charging station and the eBus, a definite association can be made between the vehicle that is disposed beneath the charging station and said charging station (association). This can be achieved if the camera is reading the information sent by the active position marker and is used for positive association of the vehicle with the charging station.

Furthermore, when using a camera this can be advantageously be used for service purposes, for example for the interfaces, by transferring the camera image to a service monitor as required.

With the present invention, it is possible at relatively low cost to accurately determine the position and orientation of the bus relative to the position tolerance region necessary for charging.

This can in particular already be carried out in the approach phase of the vehicle. In this way, positioning information for reliably reaching the precise charging position of the vehicle can be imparted to a vehicle driver. This reduces the maneuver that is necessary for reaching the position tolerance field and thus improves the reliability of the positioning.

Moreover, it can be reliably derived from the position information whether the charging process can be activated by the charging control unit or not, and/or whether kneeling of the vehicle within the contact field is permissible or must be blocked.

Although the invention has been illustrated and described in detail using preferred exemplary embodiments, the invention is not limited by the disclosed examples and other variations can be derived therefrom by a person skilled in the art without departing from the protective scope of the invention.

The invention claimed is:

1. A charging station for an at least partly electrically driven vehicle having a contact interface, the charging station comprising:
   a position-determining system having a camera and an analysis unit configured to determine a position of the contact interface using images from said camera;
   a charging interface; and
   an infrared illumination unit for illuminating a region with infrared light, wherein the region containing at least one position tolerance region in which the contact interface must be disposed so as to be contactable by means of the charging interface.

2. The charging station according to claim 1, wherein said position-determining system is configured to determine the position of the contact interface using geometric features of the contact interface.

3. The charging station according to claim 1, wherein said camera is an infrared camera.

4. The charging station according to claim 1, wherein a position determination includes determining a distance of the contact interface from said charging interface using a size of a position marker disposed on the contact interface in a camera image.

5. The charging station according to claim 1, wherein the charging station is configured to only enable a charging process if a result of a position determination is that the contact interface is disposed in the position tolerance region.

6. A system, comprising:
   a vehicle being driven at least partly electrically, said vehicle containing a storage device for electrical energy and a contact interface;
   a charging station, containing:
      a position-determining system having a camera and an analysis unit configured to determine a position of said contact interface using images from said camera;
      a charging interface;
      an infrared illumination unit for illuminating a region with infrared light, wherein the region containing at least one position tolerance region in which said contact interface must be disposed so as to be contactable by means of said charging interface;
   said charging station configured to only enable a charging process if a result of a position determination is that said contact interface is disposed in the position tolerance region; and
   said contact interface being contacted by said charging interface of said charging station so that said storage device can be charged, said contact interface having at least one position marker.

7. The system according to claim 6, wherein said position marker is embodied to selectively reflect or radiate light in a specified range of wavelengths.

8. The system according to claim 6, wherein said vehicle having a heating element for heating said position marker.

9. The system according to claim 6, wherein said vehicle and said charging station each have a unit for data transmission and said charging station is embodied to transmit a determined position to said vehicle.

10. The system according to claim 6, wherein:
   said charging station and/or said vehicle has a telemetry unit for telemetering a determined position; and
   said vehicle has a display and is configured to display a transmitted position of said vehicle on said display.

11. The system as claimed in claim 6, wherein said position marker has geometric figures or codes and by means of said geometric figures or codes, information is transmitted that enables positive association of said vehicle with said charging station.

12. The system according to claim 6, wherein said position marker has light-emitting diodes and by means of said light-emitting diodes, information is transmitted that enables positive association of said vehicle with said charging station.

* * * * *